Sept. 6, 1927. 1,641,282

W. LUTZ

V-SHAPED APPLIANCE FOR TRACTOR WHEEL LUGS

Filed Sept. 15, 1926

Inventor
Weldy Lutz,
By Clarence A O'Brien
Attorney

Patented Sept. 6, 1927.

1,641,282

UNITED STATES PATENT OFFICE.

WELDY LUTZ, OF ELDON, IOWA.

V-SHAPED APPLIANCE FOR TRACTOR-WHEEL LUGS.

Application filed September 15, 1926. Serial No. 135,613.

This invention relates generally to tractor or other similar types of wheels, the surfaces of which are equipped with lugs, the primary object of the invention residing in the provision of a complemental wheel and lug construction wherein the lugs may be readily associated with or detached from the wheel and wherein after the lugs have been secured to the wheel there will be little or no liability that the same will become displaced.

A further and important object of the invention is to provide a combination wheel and lug construction that is of such a nature as to permit of the changing of the lug from one type to another, or of the entire removal of the lugs with respect to the wheel without requiring much time or effort on the part of the operator.

Other objects and advantages of the invention will become apparent from the following description taken in connection with the accompanying drawing.

In the accompanying drawing forming part of this application and in which.

Figure 1:
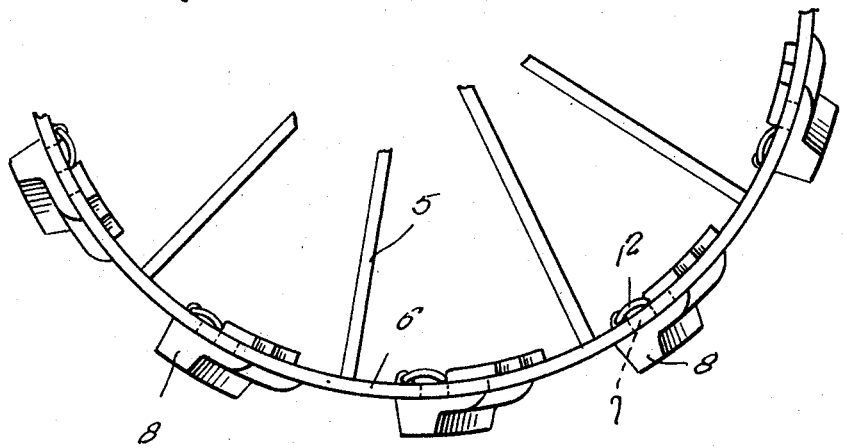
Figure 1 is a fragmentary side elevation of a tractor wheel equipped with removable lugs, said wheel and lugs being constructed in accordance with the present invention.
Figure 2:
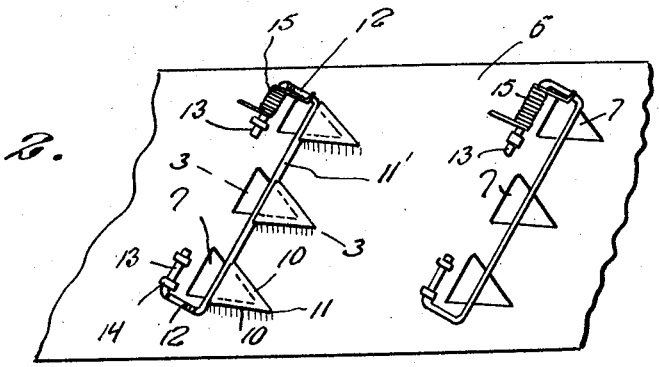
Figure 2 is an enlarged fragmentary elevation of the inner side of the wheel rim.

Now having particular reference to the drawing there is disclosed fragmentarily in Figure 1 a generally conventional type of wheel, particularly tractor wheels, including radial spokes 5 to the outer ends of which are attached the usual circular rim 6. In carrying out my invention said rim 6 is formed at predetermined spaced points throughout its circumference with a plurality of spaced relatively triangular shaped openings 7 that extend diagonally with respect to the transverse axis of the rim as clearly indicated in Figure 2, these openings being preferably three in number as illustrated.

The lugs for disposition upon the outer surface of the rim in spaced relation equal to the spaced relation between the series of openings 7 are designated by the reference character 8. The outer surfaces of these lugs may be of any desirable configuration and may be of any suitable material, the inner surfaces of these lugs being curved in a transverse direction to conform to the curvature of the rim which is a conventional expedient. Upon the inner curved surface of each lug 8 are triangular shaped blocks 9 three in number and in longitudinally spaced relation with respect to each other, these blocks being of considerably lesser area than the area of the opening 7 in the wheel rim so as to permit the same to be moved in a general circumferential relation with respect to the rim. The said blocks 9 are formed at their inner surfaces with side edge projecting flanges 10—10 that merge together at a point 11 that extends beyond the point of each respective block, the area of the flanges as well as the respective blocks being such that the blocks of the various lugs may be disposed through the openings 7 in the rim when the same are directly in alignment with said opening. However, when the lugs are moved in a direction toward the right in the three figures disclosed, said flanges 10—10 will overlap the side edges of the openings in the rim so as to prevent the detachment of the lugs with respect to the rim.

Figure 3:
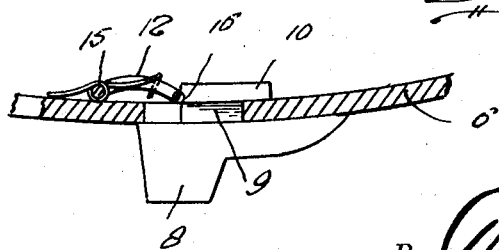
Figure 3 is a diagonal sectional view taken substantially upon the line 3—3 of Figure 2, disclosing the position of a lug with respect to the wheel when the same is fastened thereto.

For maintaining the lugs in connected relation with the rim there is provided for each lug a locking bar 11' that extends diagonally upon the inner side of the rim directly beneath the opening 7. The opposite ends of each bar extended rearwardly at right angles to the bar as at 12 and thence inwardly as at 13—13, these inwardly directed ends being mounted for turning movement within brackets 14 upon the inner face of the ring so as to permit the locking bar 10 to be swung toward or away from the blocks 9 of the respective lug 8. Surrounding one of the inwardly bent ends 13 of the locking bar is a coil spring 15, one end of which is attached to the rearwardly extending portion 12 of the bar, while the other end thereof is attached to the wheel rim and is provided for normally swinging the locking bar into lug block engaging position as more clearly indicated in Figure 3 and for preventing the accidental rearward movement of the bar when pressure is applied to the wheel lugs 8.

The rear surfaces of all of the lug blocks 9 are formed directly beyond the respective openings 7 with cross channels 16 that register with each other for receiving the locking bar so as to prevent the lugs from slippage with respect to said bar.

It will thus be seen that I have provided a highly novel, simple and efficient form of tractor wheel and lug construction wherein the lugs may be rapidly removed or attached from or to the wheel without requiring great skill and labor. Even though I have herein shown and described the invention as consisting of certain detail structural elements it is nevertheless to be understood that some changes may be made therein without effecting the spirit and scope of the appended claims.

Having thus described my invention, what I claim as new is:—

1. In combination, a wheel rim having a triangular opening, a lug, a triangular-shaped block extending from the lug and being smaller in area than the opening, and flanges on the sides of the block at the inner end thereof, and means on the rim for engaging the inner end of the block to prevent the displacement thereof from the opening, said means comprising a locking bar having angularly extending ends hingedly mounted on the rim and spring means associated with the bar to normally hold the bar in a position to prevent displacement of the block from the opening.

2. In combination, a wheel rim having an opening, a lug, a block extending from the lug and having means engageable in the opening, a locking bar having angularly extending ends hingedly mounted on the rim, and spring means associated with the bar to normally hold the bar in a position to prevent displacement of the block from the opening.

In testimony whereof I affix my signature.

WELDY LUTZ.